June 19, 1934.   T. J. MURPHY   1,963,669
SPLIT CYCLE MOTOR
Filed May 31, 1930
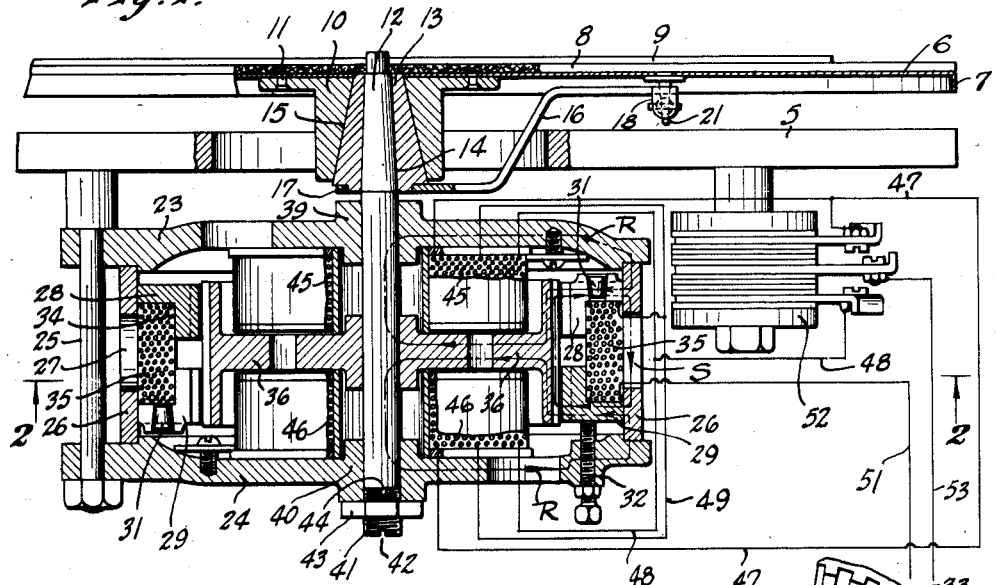
Fig. 1.
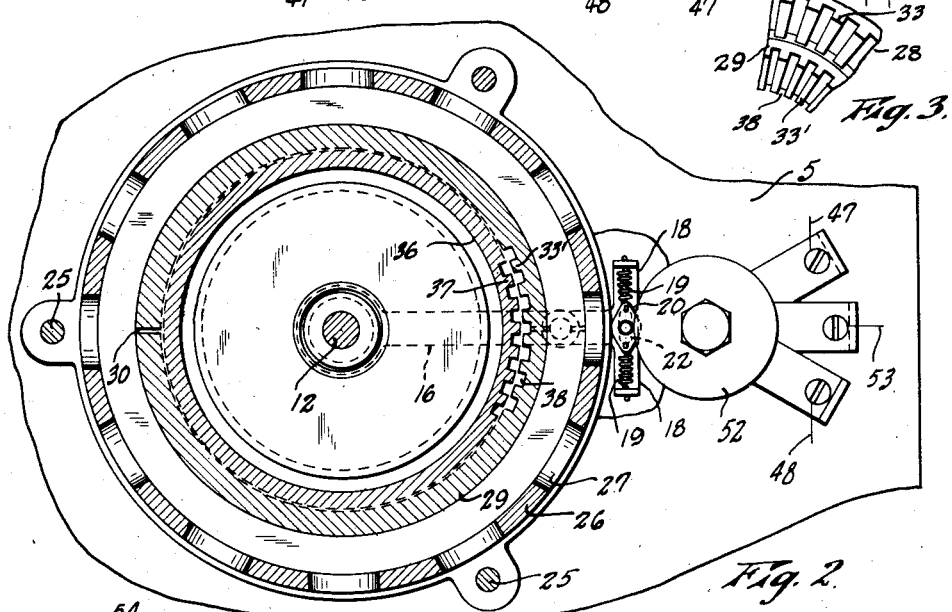
Fig. 2.
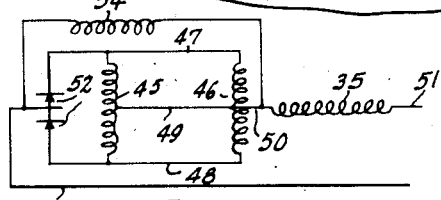
Fig. 3.
Fig. 4.
Inventor
Thomas J. Murphy
By Wooster & Davis
Attorneys Patented June 19, 1934

1,963,669

UNITED STATES PATENT OFFICE 1,963,669

SPLIT CYCLE MOTOR

Thomas J. Murphy, Stamford, Conn.

Application May 31, 1930, Serial No. 458,250

11 Claims. (Cl. 172—275)

This invention relates to an electric motor and particularly to motor and drive connection for a phonograph turn table although it is adapted for other uses if desired.

Heretofore, attempts to effectively apply synchronous motors to the driving of phonograph turn tables have been unsatisfactory because if sufficient electric energy was impressed thereon for satisfactory power, the motor would become noisy and also the phenomenon known as "hunting" would develop which would become audible with the reproduction of the record. It is, therefore, an object of my invention to provide a synchronous motor in which a relatively small amount of electrical energy is used to react on a powerful direct current field thus giving a very much greater torque with less energy and doing away with the troubles commonly experienced in other motors used for this purpose.

It is another object of the invention to provide a motor of very simple construction and, therefore, which can be manufactured at relatively low cost and which is not easily gotten out of order.

It is still another object to provide a motor which will run on a so-called split circuit or split cycle principle in which the rotor or exciting windings are connected in parallel across a split circuit in series with an alternating current working or stator winding with one or more rectifying elements connected to the opposite ends of the rotor windings and the source of current supply to supply a unidirectional current to these rotor windings, the impedance of the rotor windings being relatively low as compared to that of the working or stator winding so that the greater portion of the voltage drop is across the working winding.

It is still another object of the invention to so arrange the various elements that costly and troublesome laminated construction is unnecessary.

With the foregoing and other objects in view, the invention consists in certain combinations and arrangement of parts as will be more fully disclosed in connection with the accompanying drawing, it being understood that the construction disclosed therein is merely illustrative of my invention and that other constructions and modifications may be employed without departing from the principles of the invention. In this drawing Fig. 1 is a vertical section through one form of my improved motor and a phonograph turn table driven thereby. Fig. 2 is a transverse section substantially on line 2—2 of Fig. 1.

Fig. 3 is a detail perspective view of a portion of the two sections of the stator and Fig. 4 is a simplified wiring diagram.

In the drawing the member 5 represents the stationary top or record table of a phonograph to the under side of which my improved motor is mounted. The turn table for carrying the record is shown at 6 mounted above the stationary motor board 5 and may be of any suitable construction, the ordinary form being of suitable gauge sheet metal having a downwardly extending strengthening flange 7 at its outer periphery. The top of the turn table is usually covered with a pad of fibrous material such as felt 8 on which the record 9 rests, the felt protecting the record and also acting as a sound deadening means to prevent transmission of noises to the record. The turn table 6 is mounted on a cylindrical block or hub 10 of any suitable material, ordinarily metal having a flange riveted to the under side of the turn table as indicated at 11. The turn table is mounted on a vertical shaft 12 driven by the motor, there being a slip coupling between the turn table and the shaft to eliminate the effect of "hunting" of the motor. In the present instance, there is a tapered block 13 mounted on the shaft 12, there being a tapered passage through this block to fit the correspondingly tapered portion 14 of the shaft. The angle of this taper is acute so that the weight of the block and the turn table will cause a tight fit on the shaft. An inclusive angle of about 5 degrees between the sides of the taper will give this effect. The outer wall 15 of the block 13 is also tapered to fit a similarly tapered opening in the hub 10, but the angle between these inclined walls is much greater so that there is no binding action between the block 13 and the hub 10, but the hub is free to turn on the block as the angle between the sides is not an acute angle, an angle which will give this effect being approximately 30 degrees. This construction, while permitting relative turning of the hub 10 and turn table 6 on the shaft, will automatically compensate for wear and will maintain the table central.

The turn table is driven by an arm 16 secured to the block 13 as by fastening on the shoulder 17 on the lower end of the block. At its free end, the arm 16 has lateral projections 18 connected to the outer ends of tension springs 19, the other ends of these springs being connected to a tamping 20 having an opening to receive a tapered pin 21 projecting downwardly from the under side of the turn table 6. The arm 16 has an elongated slot 22 through which this pin projects to permit relative movement of the pin with respect to the arm 16. It will thus be seen that the driving force from the shaft to the turn table is transmitted through the arm 16 and springs 19 to the pin 21. Thus, the springs will yield sufficiently to compensate for the variations in speed of shaft 14 and arm 16 caused by so-called "hunting" effects of the motor. That is, its tendency to speed up slightly and then retard slightly instead of running with a steady constant speed. This "hunting" effect will not be transmitted to the turn table because of the inertia of the turn table and associated parts, the slip coupling between the hub 10 and the block 13, and the drive through the springs 19, and the turn table will be driven with a steady constant speed.

The motor is of very simple construction comprising two spaced heads or plates 23 and 24 of suitable metal and may be cast iron mounted on bolts 25 secured to the underside of the top 5. These heads or plates are held in proper spaced relation by a metal ring or shell 26 which may also be of cast iron, and it may have openings 27 to break up the continuity of the shell or ring and reduce the flow of currents therein. Mounted within the shell or ring 26 is a stator comprising two spaced elements 28 and 29 which are in the form of rings split at one side as at 30 so as not to form a closed circuit. A tapered pin or wedge 31 of insulating material is preferably forced in at this split end to keep them apart and also to clamp the stator ring against the inner surface of the shell 26 and secure it in position. The lower stator ring 29 may also be supported by any suitable number of adjusting screws 32 threaded through the lower head or plate 24, there being three of these screws used in the present instance to properly locate the stator and prevent its dropping down. The stator rings are made of any suitable magnetic material and may be cast iron, and each have any suitable number of transversely extending spaced pole portions 33. The two stator rings are recessed or rabbeted on one side as indicated at 34 to receive working or stator winding 35, this winding serving to excite both stator rings, and a distinguishing feature is that, as shown in Fig. 3, the poles 33 of one stator ring are offset one-half the pitch or polar distance with respect to the poles 33' of the other stator ring 29. That is, the poles of one stator ring are opposite the spaces between the poles of the other stator ring for a purpose presently to be described.

Within the two spaced stator rings is a rotor 36, which may also be of cast iron, mounted on and secured to the shaft 12. This rotor overlaps both stator rings and has transversely extending pole portions 37 of similar width and spacing as the poles on the rings and the number of poles on the rotor is the same as the number on each stator ring. It will, thus be evident that while the poles 37 on the rotor are opposite the spaces or grooves 38 between the poles 33' of the lower stator ring 29 as shown in Fig. 2, they will be opposite the poles 33 of the upper stator ring 28 and vice versa.

The shaft 14 has a bearing 39 in the upper plate or head 23 and another bearing 40 in the lower plate or head 24. It also has a thrust bearing at its lower end on a stud 41 threaded in the head 24 for adjustment therein by means of a screw driver or other tool in a slot 42 and clamped in adjusted position by lock nut 43. The inner end of the stud 41 may have a transverse slot 44 for oil to improve lubrication. There is, thus, a certain amount of friction between the shaft and stud 41 which still further tends to reduce "hunting" of the rotor.

On each side of the central rib of the rotor is an exciting winding 45 and 46, these windings being wound in opposite directions, but each winding being continuously wound in the same direction. These windings 45 and 46 are connected in parallel across a split circuit as indicated in Fig. 4, the split circuit being indicated by the leads 47 and 48, the opposite ends of the two windings being connected to these leads. The centers of the two windings 45 and 46 are also connected together by lead 49 and these centers are connected by a lead 50 to one end of the stator winding 35. The other end of the stator winding is connected by lead 51 to one side of a source of alternating current supply. The two leads 47 and 48 of the split circuit are shown connected to the two ends of a dry plate, such for example as copper oxide, rectifying element 52, the center of this element being connected by lead 53 to the other side of the alternating current supply. This in effect makes element 52 the equivalent of two rectifiers, one on each side of connection 53 and therefore two rectifiers may be used in place of one rectifier 52 if desired, one being shown in use merely for simplicity. It is also preferred that an induction coil 54 be connected across the split circuit and the rectifying element 52, that is, between the leads 50 and 53 as indicated in Fig. 4. This induction coil 54 will ordinarily be wound on an iron core. The rectifying element 52 may be mounted at any suitable location, preferably on the under side of the top 5 as shown. For simplicity and convenience, this is preferably a single rectifying element connected at its opposite ends to the two windings and at its center to one side of the source of current supply, but of course, the same effect could be secured by two separate rectifying elements, one between the lead 53 and one side of the split circuit and one between this lead and the other side of the split circuit, the effect being the same in both instances.

The operation is as follows. It will be evident from the arrangement shown that the magnetic flux path for winding 45 is through the top plate 23, shell 26, stator ring 28, the upper portion of the rotor 36 and the shaft 12, while the flux path for the lower winding 46 is through the head or plate 24, shell 26, stator ring 29, the lower portion of the rotor 36 and the shaft 12. Also, that as these windings are wound in opposite directions and at any given instant, the current flows in the same direction through the two windings, the direction of flow of flux is in opposite directions in these two paths. The flux path for the stator winding 35 is through the shell 26, stator ring 28, rotor 36 and stator ring 29. It will thus be seen that the direct current windings 45 and 46 are so disposed in relation to the alternating current winding 35 that there are two different magnetic circuits or flux paths, and therefore, there is no inductive couple between the D. C. windings and the A. C. windings.

Referring to the wiring diagram, Fig. 4, if we assume the current enters at any instant through the connection 53 to the center of the rectifying element 52, it will be permitted to flow through one side of the split circuit 47, 48 and prevented from flowing to the other side. We will assume it flows through the side 47 and it will, therefore, be seen that it flows through the upper halves of the two windings 45 and 46 to the alternating or stator winding 45, and as the two windings 45 and 46 are wound in opposite directions, the fluxes in the two exciting or rotor paths flow in the directions indicated by the arrows R in Fig. 1. At the same time, the flux caused by the stator winding 45 we will assume flows in the direction of the arrows S of Fig. 1. It will then be seen, at this instant, the two fluxes are added at the lower part of the circuit through the lower stator ring 29 and the lower part of the rotor and we have, therefore, maximum flux in these elements, while in the circuits above the center the fluxes are opposed in the upper part of the rotor and the stator ring 28 giving zero flux between these two elements. As now, the flux is a maximum in the lower part of the rotor the poles 37 of the rotor should be opposite the spaces between the poles 33' of the lower stator ring 29, but the poles 37 are of opposite polarity so that there is a torque tending to rotate the rotor. At the same time, the poles 37 of the rotor are opposite the poles 33 of the upper stator ring 28 and as there is no flux between them there is thus no torque. On the other half of the cycle, these conditions are changed so that the maximum flux is through the upper stator ring 28 and the upper half of the rotor when the poles 37 of the rotor are opposite the spaces between the poles 33 of the upper stator ring 28. At this time, because the poles of the two stator rings are offset one-half the distance between the poles, the poles of the rotor are opposite the poles of the lower stator ring 29, but as the fluxes between the lower part of the rotor and the lower stator ring are now opposed, there is zero flux. This changing at every alternating current cycle will cause a rotation of the rotor if an initial start be given to this rotor. It is in reality a double-action motor, each stator ring and corresponding half of the rotor exerting torque alternately, and as the fluxes are added at the time this torque is exerted, we secure a greater torque for a given amount of current. It would seem that this motor is functioning on a split cycle principle rather than an alternating principle and if a proper ratio of windings is obtained between the rotor and stator windings there is no reversal of flux in the stator elements, consequently little energy lost in the stator and thereby eliminating the necessity of troublesome lamination.

That is by split cycle is meant that there is a split circuit provided with one or more rectifiers so arranged and connected that during one half of the alternating current cycle current flows in one direction in one branch of the split circuit and during the other half of the cycle it flows in the opposite direction in the other branch of the circuit. Thus it can be said the alternating current cycle is split so that one half is passed through one branch of the circuit in one direction and the other half is passed through the other branch in the opposite direction. This may be explained by referring to Fig. 4. It will be clear that if during one half of the alternating cycle current is considered as entering by lead 53 it will flow through the upper rectifier to the lead 47 and the upper halves of the windings 45 and 46 to winding 35, and on the other half of the cycle it will enter through winding 35 and will pass through the lower halves of windings 46 and 45 to the lower rectifier 52 and out the lead 53. This shows that the cycle is split and during one half current passes through one branch of the split circuit in one direction and during the other half of the cycle it flows in the opposite direction in the other branch, and the full wave is utilized. In either case the upper halves of the windings 45 and 46 are in series with the alternating winding 35 and the upper rectifier, while the lower halves of windings 45 and 46 are in series with the winding 35 and the lower rectifier.

The number of poles on the stator and rotor depend on the speed desired and the number of cycles per second of the alternating supply current. Thus, if we use 60 cycle current and have 45 poles on the rotor, one pole of the rotor must pass the distance between two poles of the stator or the polar pitch during each cycle, or that is, one-sixtieth of a second, or it takes forty-five-sixtieths of a second for each revolution of the rotor. Therefore, this would give a speed of eighty revolutions per minute, or if we use 46 poles on the rotor and each stator ring we will have approximately seventy-eight revolutions per minute which is the speed usually desired for phonograph records. Thus, with this arrangement, the number of poles on each stator ring and the rotor is only half the number required in other synchronous motors for attaining speed, because in the present case, the poles of the two stator rings are added together to give the full number for any given speed. This makes for cheaper and easier machining and even rough castings for the stator and rotors can be used satisfactorily, it being merely necessary to grind the outer surface of the rotor and the inner surfaces of the stator rings to secure the proper clearance, thereby lowering the cost of manufacture. It is also preferable that the impedance of the rotor windings 45 and 46 be relatively low as compared with that of the stator winding 35 so that there is relatively low voltage drop across the rotor windings while the greater part of the voltage drop is absorbed by the stator winding 35.

It is found that in connecting the rotor winding 45 and 46 in multiple, as shown, that substantially fewer rectifying discs are required in the rectifying element due to flow of local currents in the multiple arrangement of windings generated by partial collapse of the field twice every cycle. It is also preferred to connect an induction coil 54 across the rectifying element and the rotor windings as this lowers the capacity required for the rectifying element.

While in the specification and claims element 36 has been described as the rotor and the elements 28 and 29 the stator and this is the preferred construction as it is the more simple, it will however be evident that the mountings may be reversed so that the element 36 is the stator and elements 28 and 29 would constitute the rotor without changing the principle of the invention, as it is relative movement between the two which is the object to be accomplished.

Having thus set forth the nature of this invention, what I claim is:

1. In a device of the character described a rotor and a stator having cooperating poles, windings associated with the rotor, a stator winding, a split circuit having separate branches, said rotor windings being connected across the branches of the split circuit, the centers of said rotor windings being connected to the stator winding, a rectifier means in each branch and connected to an end of the rotor winding in that branch, the rectifier in one branch being arranged to pass current in the opposite direction to that in the other branch, alternating current supply leads, a connection from the other end of the stator winding to one lead, and a connection from the other sides of the rectifiers to the other lead.

2. In a device of the character described, a rotor having external spaced polar portions, a stator surrounding the rotor having internal spaced polar portions, exciting windings in the rotor, a working winding about the stator, means for connecting the exciting windings in multiple, means for connecting the centers of the exciting windings with one end of the working winding, alternating current supply leads, means connecting the other end of the working winding with one lead, and means connected with the other lead and the ends of the exciting winding for rectifying the current and producing pulsating current alternately in opposite directions in the two portions of the exciting windings respectively.

3. In a device of the character described, a rotor having external spaced polar portions, a stator surrounding the rotor having internal spaced polar portions, exciting windings for the rotor, a working winding for the stator, a split circuit having branches, a rectifier means in each branch of said circuit and arranged so that current will pass in one direction in one branch and in the opposite direction in the other branch, alternating current supply leads, one of said leads being connected between the rectifiers, means connecting the exciting windings in series across the branches of said split circuit, a connection from the other lead to one end of the working winding, and means connecting the opposite end of the working winding between the exciting windings.

4. In a device of the character described, a pair of circular stator elements having spaced pole portions, the pole portions of one stator element being in alignment with the spaces between the pole portions of the other stator element, a winding about said element, a rotor having similarly spaced pole portions to the stator elements and overlapping said elements, oppositely wound windings associated with said rotor connected across the branches of a split circuit, means connecting the centers of the rotor windings to the stator winding, a source of alternating current supply, means for connecting the other end of the stator winding to the source of alternating current supply, rectifier means connected to the opposite ends of the exciting windings, means for connecting the rectifier means to the source of current supply, and said rectifier means arranged to cause current to flow in one direction through one branch during one half the alternating current cycle and in the opposite direction in the other branch during the other half of the cycle.

5. In a device of the character described, a pair of circular stator elements spaced one above the other and each having spaced pole portions offset one-half the polar pitch from the pole portions of the other stator element, a winding for exciting said elements, a rotor having upright similarly spaced pole portions overlapping both stator elements, a pair of oppositely wound windings for exciting the rotor, means connecting the centers of the rotor windings to one end of the stator winding, alternating current supply leads, means connecting the other end of the stator winding to one lead, rectifier means connected to the ends of the rotor windings, and means connecting the rectifier to the other lead, said rectifier means being arranged to permit current to pass in one direction through one winding and in the opposite direction through the other winding.

6. In a device of the character described, a pair of laterally spaced stator elements each having spaced pole portions, one stator element being offset with respect to the other so that the pole portions of one is in alignment with the spaces between the pole portions of the other, a winding for exciting said stator elements, a rotor having similarly spaced pole portions overlapping both stator elements, windings for exciting said rotor, a source of alternating current supply, means for connecting one end of the stator winding to the source of alternating current supply and the other end of the winding to the centers of the rotor windings, and rectifier means for sending a unidirectional current alternately through the two sections of the rotor windings but in an opposite direction in one-half of each of the windings to that in the other.

7. In a device of the character described, a rotor having spaced poles extending in a direction longitudinally of its axis, a stator comprising a pair of spaced elements each having similarly spaced poles with the poles of one element offset from the poles of the other element one-half the polar distance, a stator winding, a split circuit having branches in series with the stator winding, rotor windings connected across said branches, means whereby the split circuit may be connected to a source of alternating current, and rectifying means connected to the opposite branches of the split circuit to cause an unidirectional current to flow alternately in one direction in one of the rotor windings and in the opposite direction in the other rotor winding.

8. In a device of the character described, a rotor having spaced poles, a stator having similarly spaced poles, a stator winding, a split circuit having branches, rotor windings, means connecting the rotor windings across the branches of the split circuit, said branches being in parallel with each other and in series with the stator winding, means whereby the split circuit may be connected to a source of alternating current, and rectifying means connected to the opposite branches of the split circuit and arranged to cause an unidirectional current to flow alternately in the rotor windings with the current in one winding flowing in the opposite direction to that in the other winding, the impedance of the rotor winding being relatively small as compared with the stator winding so that there is a relatively low voltage drop in the rotor windings with a relatively large voltage drop in the stator winding.

9. In a device of the character described, a shaft, a rotor on the shaft having spaced poles extending longitudinally of its axis, a pair of spaced stator elements having similarly extending and spaced poles adjacent the rotor and overlapped thereby, a metal ring embracing the stator elements, a winding for exciting the stator elements, metal plates connecting the shaft and said ring on opposite sides of the rotor, rotor windings on opposite sides of the rotor and between it and said plates whereby there is inductive couple between the flux paths for the rotor windings and that for the stator winding, a split circuit having parallel branches in series with the stator winding, means connecting the rotor windings across said branches, means whereby the split circuit may be connected to a source of alternating current, and rectifying means connected to the opposite branches of the split circuit and arranged to cause unidirectional current to flow alternately in respective branches and in one direction in one branch and in the opposite direction in the other branch.

10. In a device of the character described, a rotor and a stator having cooperating poles, windings associated with the rotor, a stator winding, a split circuit having branches in parallel, said rotor windings being connected across said branches, the centers of said rotor windings being connected to the stator winding, rectifier means in the split circuit and connected at its opposite ends to the ends of the rotor windings, alternating current supply leads, a connection from the other end of the stator winding to one lead, a connection from the rectifier means to the other lead, said rectifier being arranged so that current will flow in one direction in one branch and in the opposite direction in the other branch, and a reactance in shunt with the rectifier and rotor windings.

11. In an electric motor, working windings, exciting windings, said exciting windings being connected as a branched circuit, the center of the exciting windings being connected to one end of the working windings, a rectifier means in each branch of said circuit and connected to the ends of the exciting windings, the rectifier in one branch being arranged to pass current in the opposite direction to that in the other branch, alternating current supply leads, a connection from the other end of the working windings to one lead, and a connection from the other sides of the rectifiers to the other lead.

THOMAS J. MURPHY.